(12) United States Patent
Niinuma

(10) Patent No.: US 11,081,085 B2
(45) Date of Patent: Aug. 3, 2021

(54) ON-BOARD INFORMATION DISPLAY CONTROL SYSTEM

(71) Applicant: MITSUBISHI ELECTRIC CORPORATION, Tokyo (JP)

(72) Inventor: Daiki Niinuma, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/072,027

(22) PCT Filed: Feb. 3, 2016

(86) PCT No.: PCT/JP2016/053250
§ 371 (c)(1),
(2) Date: Jul. 23, 2018

(87) PCT Pub. No.: WO2017/134775
PCT Pub. Date: Aug. 10, 2017

(65) Prior Publication Data
US 2019/0043449 A1 Feb. 7, 2019

(51) Int. Cl.
*G09G 5/12* (2006.01)
*G09G 5/14* (2006.01)
(Continued)

(52) U.S. Cl.
CPC ............... *G09G 5/12* (2013.01); *B61L 15/009* (2013.01); *B61L 15/0072* (2013.01);
(Continued)

(58) Field of Classification Search
CPC ....... G06F 3/1423; G06F 3/1446; G09G 5/12; G09G 5/14; G09G 2340/0464;
(Continued)

(56) References Cited

U.S. PATENT DOCUMENTS

2002/0169833 A1  11/2002  Tani et al.
2005/0280601 A1*  12/2005  Fukue ................... G06F 3/1431
                                                  345/1.1
(Continued)

FOREIGN PATENT DOCUMENTS

JP   2002-373133 A   12/2002
JP   2008-160204 A   7/2008
WO   WO 2011/004666 A1   1/2011

OTHER PUBLICATIONS

International Search Report (PCT/ISA/210) dated May 10, 2016, by the Japan Patent Office as the International Searching Authority for International Application No. PCT/JP2016/053250.
(Continued)

*Primary Examiner* — Shaheda A Abdin
(74) *Attorney, Agent, or Firm* — Buchanan Ingersoll & Rooney PC

(57) ABSTRACT

An on-board information display device can effectively display information by synchronizing a plurality of display units in accordance with information to be provided. The on-board information display device controls a plurality of display units, and includes an on-board information display controller including: a display-execution-processing determination unit that outputs a display-execution-processing determination result indicating whether parts or all of display screens to be displayed on the plurality of display units are to be synchronized, in accordance with on-board information to be displayed on the plurality of display units; and a display data generation unit that receives the display-execution-processing determination result and generates display data to allow the display screens to be displayed on the plurality of display units, in synchronization or without synchronization in accordance with the display-execution-processing determination result.

1 Claim, 10 Drawing Sheets

(51) Int. Cl.
  *B61L 15/00* (2006.01)
  *G06F 3/14* (2006.01)
  *H04N 21/214* (2011.01)
(52) U.S. Cl.
  CPC .......... *G06F 3/1423* (2013.01); *G06F 3/1446* (2013.01); *G09G 5/14* (2013.01); *H04N 21/2146* (2013.01); *G09G 2340/0464* (2013.01); *G09G 2380/10* (2013.01)
(58) Field of Classification Search
  CPC ............ G09G 2380/10; H04N 21/2146; B61L 15/009; B61L 15/0072
  See application file for complete search history.

(56) References Cited

U.S. PATENT DOCUMENTS

| | | | |
|---|---|---|---|
| 2012/0066713 A1 | 3/2012 | Takada et al. | |
| 2013/0283655 A1* | 10/2013 | Saito | B61K 13/00 40/370 |
| 2014/0132833 A1* | 5/2014 | Wang | H04N 21/4122 348/383 |

OTHER PUBLICATIONS

Written Opinion (PCT/ISA/237) dated May 10, 2016, by the Japan Patent Office as the International Searching Authority for International Application No. PCT/JP2016/053250.

Japanese Office Action (Notification of Reasons for Refusal) dated Sep. 30, 2016, issued in the corresponding Japanese Patent Application No. 2016-553911. (5 pages).

Japanese Office Action (Notification of Reasons for Refusal) dated Dec. 26, 2016, issued in the corresponding Japanese Patent Application No. 2016-553911. (4 pages).

Extended European Search dated Nov. 26, 2018 issued by the European Patent Office in corresponding European Patent Application No. 16889264.4 (10 pages).

Office Action (Communication pursuant to Article 94(3) EPC) dated Jun. 8, 2020, by the European Patent Office in corresponding European Patent Application No. 16889264.4. (11 pages).

Office Action issued on Jun. 8, 2020, by the India Patent Office in corresponding India Patent Application No. 201847026394 and English translation of the Office Action. (8 pages).

\* cited by examiner

ON-BOARD INFORMATION DISPLAY CONTROL SYSTEM

FIELD

The present invention relates to an on-board information display device, an on-board information display control device, an on-board information display control system, and an on-board information display control method for providing on-board information to passengers on a train.

BACKGROUND

Trains conventionally provide service to passengers by displaying, on a display device, on-board information including operation information such as a destination, a stop, a current train location, and delay information.

For the purpose of "displaying information by dividing a screen and displaying different contents on different display units" in a train including a plurality of display devices, Patent Literature 1 discloses an information distribution system that "includes a mobile object information server disposed in a mobile object and the plurality of display devices each disposed at a predetermined site in the mobile object. The mobile object information server includes a recording server that stores distribution information to be displayed on the plurality of display devices and a first control unit that controls the recording server. Each of the plurality of display devices includes the display unit and a second control unit that controls the display unit. The recording server stores control information used to display information on the plurality of display units and a distribution information table including display data. The display data is displayed on one screen or a plurality of screens on each of the display units on the basis of the distribution information table".

CITATION LIST

Patent Literature

Patent Literature 1: Japanese Patent Application Laid-open No. 2008-160204

SUMMARY

Technical Problem

Although the conventional technique described above can display different information on the different display devices, the plurality of display devices cannot be combined to form a single display screen for display. This poses a problem of failure to display information effectively depending on information that is to be provided.

The present invention has been made in view of the above, and an object of the invention is to obtain an on-board information display device that can effectively display information by synchronizing a plurality of display units in accordance with information that is to be provided.

Solution to Problem

To solve the above problem and achieve the object, the present invention provides an on-board information display device to control a plurality of display units, the device comprising an on-board information display controller including: a display-execution-processing determination unit to output a display-execution-processing determination result indicating whether parts or all of display screens to be displayed on the plurality of display units are to be synchronized, in accordance with on-board information to be displayed on the plurality of display units; and a display data generation unit to receive the display-execution-processing determination result and generate display data to allow the display screens to be displayed on the plurality of display units in synchronization or without synchronization in accordance with the display-execution-processing determination result.

Advantageous Effects of Invention

The present invention can effectively display the information by synchronizing the plurality of display units in accordance with information that is to be provided.

DESCRIPTION OF EMBODIMENTS

An on-board information display device, an on-board information display control device, an on-board information display control system, and an on-board information display control method according to embodiments of the present invention will now be described in detail with reference to the drawings. Note that the present invention is not limited to the embodiments.

First Embodiment

Figure 1:
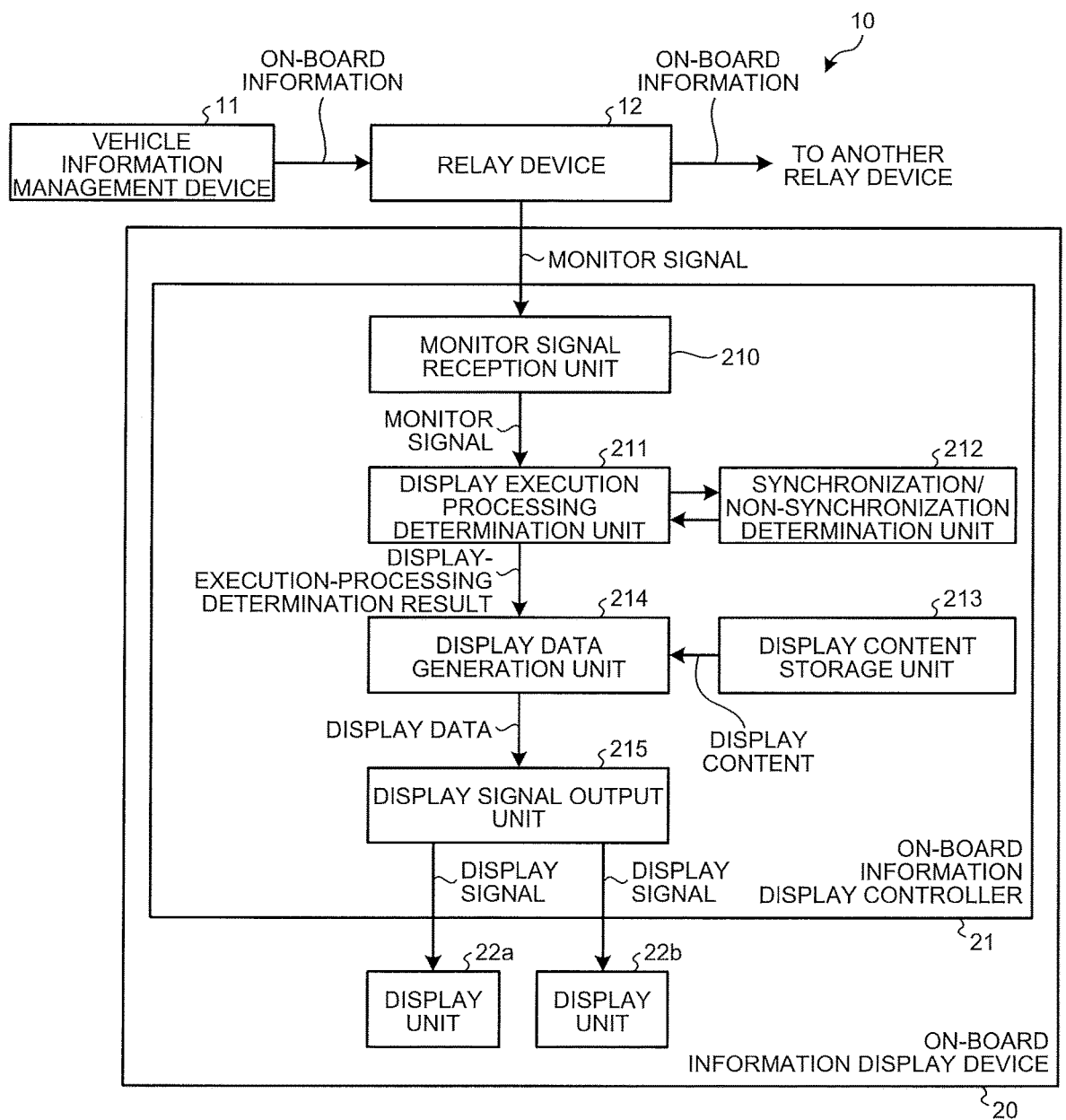
FIG. 1 is a diagram illustrating an example of the configuration of an on-board information display control system including an on-board information display device according to a first embodiment.

FIG. 1 is a diagram illustrating an example of the configuration of an on-board information display control system 10 including an on-board information display device 20 according to a first embodiment of the present invention. The on-board information display control system 10 illustrated in FIG. 1 includes a vehicle information management device 11, a relay device 12, and the on-board information display device 20.

The vehicle information management device 11 acquires vehicle information on a train equipped with the on-board information display control system 10. From the vehicle information, the vehicle information management device 11 generates on-board information that is information to be displayed on the on-board information display device 20. The vehicle information management device 11 transmits the generated on-board information to the relay device 12. The vehicle information, which is information used in generating the on-board information, includes "kilometrage", or travelled distances in kilometers and speed of the train equipped with the on-board information display control system 10.

The relay device 12 receives the on-board information transmitted from the vehicle information management device 11, generates a monitor signal from the received on-board information, and transmits the generated monitor signal to the on-board information display device 20. Note that the relay device 12 also transmits the on-board information to another relay device.

The on-board information display device 20 includes an on-board information display controller 21 and display units 22a and 22b. The on-board information display controller 21 includes a monitor signal reception unit 210, a display execution processing determination unit 211, a synchronization/non-synchronization determination unit 212, a display content storage unit 213, a display data generation unit 214, and a display signal output unit 215.

The monitor signal reception unit 210 receives the monitor signal from the relay device 12 and outputs the monitor signal to the display execution processing determination unit 211.

On the basis of the monitor signal received from the monitor signal reception unit 210, the display execution processing determination unit 211 determines the content of processing to be executed, from the on-board information, requests the synchronization/non-synchronization determination unit 212 to determine whether to perform synchronous display or non-synchronous display, and outputs to the display data generation unit 214 a display-execution-processing determination result.

In response to the request from the display execution processing determination unit 211, the synchronization/non-synchronization determination unit 212 determines whether to perform the synchronous display or the non-synchronous display, from the on-board information, and outputs control information on a timing at which to switch the display.

The display content storage unit 213 stores a play list in which the contents to be displayed are listed.

The display data generation unit 214 generates display data on the basis of the result of determination on the display execution processing received from the display execution processing determination unit 211 and the display content stored in the display content storage unit 213, and outputs the generated display data to the display signal output unit 215.

The display signal output unit 215 generates a display signal on the basis of the display data received from the display data generation unit 214 and outputs the generated display signal to the display units 22a and 22b.

The display units 22a and 22b each perform on-board information display on the basis of the display signal received from the display signal output unit 215. Note that the display units 22a and 22b can be installed, for example, over a boarding door, over a window, over a gangway door, and at a position where an advertisement is hung.

Figure 2:
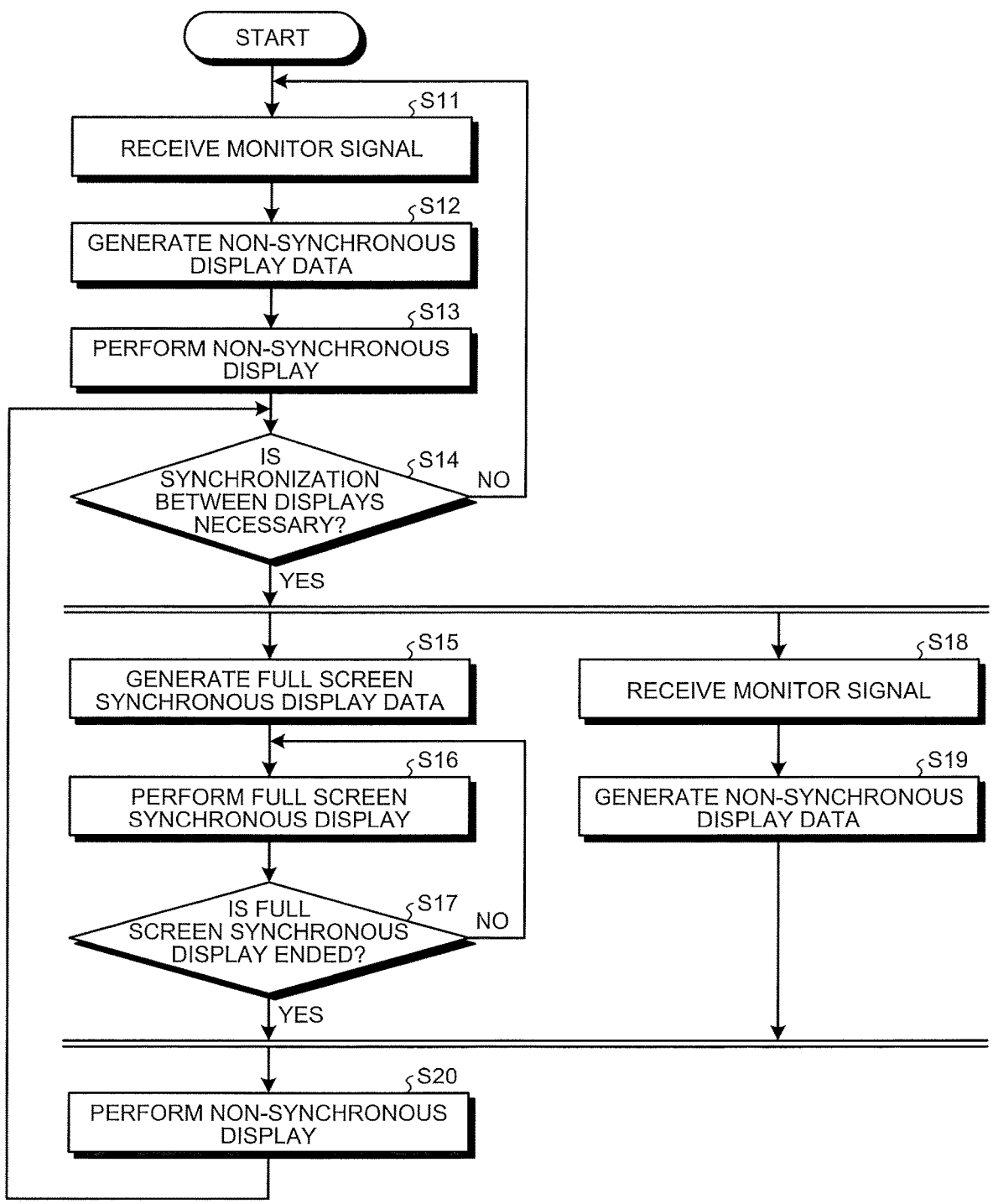
FIG. 2 is a flowchart illustrating an example of the operation of an on-board information display controller of the on-board information display device according to the first embodiment.

FIG. 2 is a flowchart illustrating an example of the operation of the on-board information display controller 21 of the on-board information display device 20 according to the first embodiment. Once the processing is started, the display execution processing determination unit 211 receives the monitor signal that is generated from the on-board information transmitted from the vehicle information management device 11 (S11). The display execution processing determination unit 211 makes a determination about the content of display-execution-processing, and outputs a display-execution-processing determination result to the display data generation unit 214.

Next, the display data generation unit 214 generates non-synchronous display data (S12). The display signal output unit 215 then generates display signals, using the non-synchronous display data. The display signal output unit 215 outputs the generated display signals to the display units 22a and 22b, whereby the display units 22a and 22b perform non-synchronous display (S13). The term "non-synchronous display" as used herein means that the display units 22a and 22b perform display without synchronizing with each other.

The display execution processing determination unit 211 thereafter determines whether or not synchronization between the display units 22a and 22b is necessary (S14). If the synchronization between the display units 22a and 22b is unnecessary (No in S14), the processing returns to S11 to receive the monitor signal and check information from the vehicle information management device. That is, the processing from S11 to S14 is repeated until the synchronization between the display units 22a and 22b becomes necessary. If the synchronization between the display units 22a and 22b is necessary (Yes in S14), the display data generation unit 214 generates full screen synchronous display data (S15), and the display units 22a and 22b perform full screen synchronous display by using display signals generated from the full screen synchronous display data (S16). The display execution processing determination unit 211 thereafter determines whether the full screen synchronous display is ended (S17). The term "full screen synchronous display" as used herein means that the display units 22a and 22b jointly form a single display screen as a whole to perform display.

In parallel with the processing from S15 to S17, the display execution processing determination unit 211 receives the monitor signal from the vehicle information management device 11 (S18) to check the information, so that the display data generation unit 214 generates nonsynchronous display data (S19). If the full screen synchronous display is not ended (No in S17), the processing returns to S16 and repeats the full screen synchronous display. If the full screen synchronous display is ended (Yes in S17), the display units 22a and 22b perform the non-synchronous display by using the non-synchronous display data generated in S19 (S20), then the processing returns to S14.

Note that information that requires the display units 22a and 22b to synchronize with each other for the full screen synchronous display includes, for example, wide-area route information, nearby route information, appreciation-expressing information upon the departure and arrival of the train, station facilities information, door-opening-side information, and information giving advance notice of the shaking of the train. Alternatively, the display units 22a and 22b may perform the full screen synchronous display to display the advertisement. The wide-area route information is information that indicates a route of the train from the current location thereof to subsequent stops including not only the next station but at least a stop after the next station. The nearby route information is information that indicates a route of the train from the current location thereof to the next stop. The appreciation-expressing information upon the departure and arrival of the train is information that expresses the appreciation to passengers for boarding the train, the appreciation-expressing information being displayed immediately after the train departs a starting station and immediately before the train arrives at a terminal station. The station facilities information indicates information regarding the facilities of the station such as the location of a stairway, an elevator, or a ticket gate at a next stop before the train arrivals at this next stop. The door-opening-side information is information that indicates a side on which doors of the train will be open at the next stop. The information, which gives the advance notice of the shaking of the train, alerts passengers when there is a spot where the train is likely to shake ahead of the current location of the train.

Note that the vehicle information such as the kilometrage or speed of the train or ground information transmitted from a ground radio station as needed may act as a trigger to start displaying the information which should be displayed on the display units in synchronization.

Note that the non-synchronous display data in S19 is generated at regular intervals, and the generated non-synchronous display data is used at the time of the non-synchronous display in S20. That is, the processing of S18 and S19 is performed in order to enable the non-synchronous display immediately upon the completion of the full screen synchronous display.

In the first embodiment described above, the on-board information display controller 21 includes at least a processor, a memory, a reception unit, and an output unit, where the operation of each unit can be implemented by software.

Figure 3:
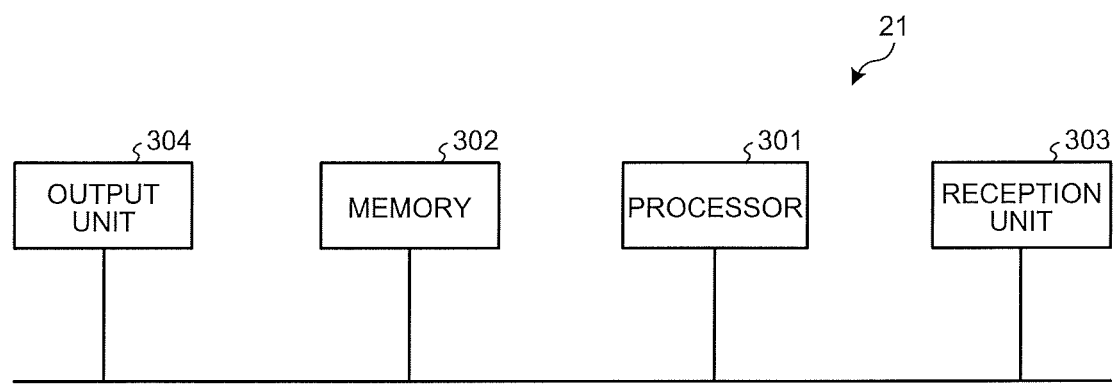
FIG. 3 is a diagram illustrating an example of a typical configuration of hardware implementing the on-board information display controller of the on-board information display device according to the first embodiment.

FIG. 3 is a diagram illustrating an example of a typical configuration of hardware implementing the on-board information display controller 21 of the on-board information display device according to the first embodiment. The on-board information display controller 21 illustrated in FIG. 3 includes a processor 301, a memory 302, a reception unit 303, and an output unit 304. The processor 301 uses received data to perform calculation and control by software, and the memory 302 stores received data or software and data necessary for the processor 301 to perform the calculation and control. The memory 302 also implements the display content storage unit 213. The reception unit 303 corresponds to the monitor signal reception unit 210 and receives the monitor signal transmitted from the relay device 12. The output unit 304 corresponds to the display signal output unit 215 and outputs the display signals to the display units 22a and 22b. Note that the processor 301, the memory 302, the reception unit 303, and the output unit 304 may be plural in number.

Figure 4:
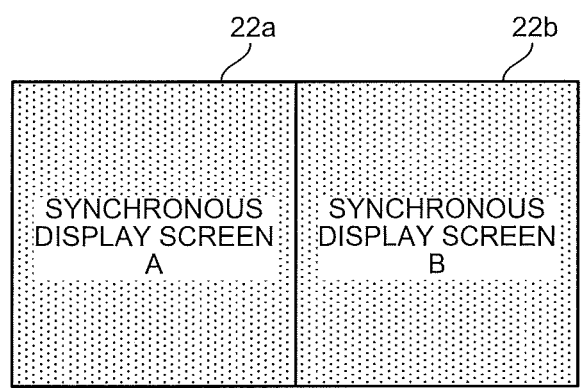
FIG. 4 is a diagram illustrating an example of a display screen according to the first embodiment.

FIG. 4 is a diagram illustrating an example of the display screen according to the first embodiment. As illustrated in FIG. 4, a synchronous display screen A is displayed on the display unit 22a, a synchronous display screen B is displayed on the display unit 22b, and the synchronous display screen A and the synchronous display screen B form a single screen.

Figure 5:
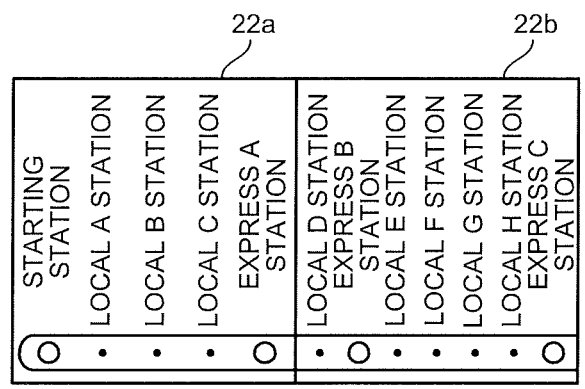
FIG. 5 is a diagram illustrating a specific example of the display screen according to the first embodiment.

FIG. 5 is a diagram illustrating a specific example of the display screen according to the first embodiment. FIG. 5 illustrates a route map of the wide-area route information indicating that a train departing from a starting station will stop at an express A station without stopping at a local A station, a local B station, and a local C station, stop at an express B station without stopping at a local D station, and stop at an express C station without stopping at a local E station, a local F station, a local G station, and a local H station. As illustrated in FIG. 5, the single display unit can indicate only up to the express A station on the route map, but the plurality of display units performing the synchronous display can indicate the route map up to the express C station.

Figure 6:
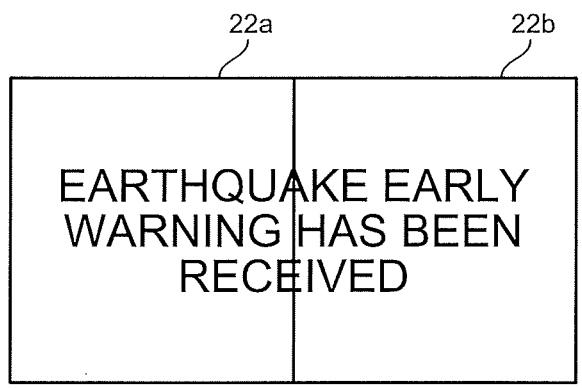
FIG. 6 is a diagram illustrating a specific example of the display screen according to the first embodiment.

FIG. 6 is a diagram illustrating a specific example of the display screen according to the first embodiment. FIG. 6 indicates that an Earthquake Early Warning is received. As illustrated in FIG. 6, the plurality of display units performing the synchronous display can notifies a passenger far from the display screen of important information having high urgency.

Figure 7:
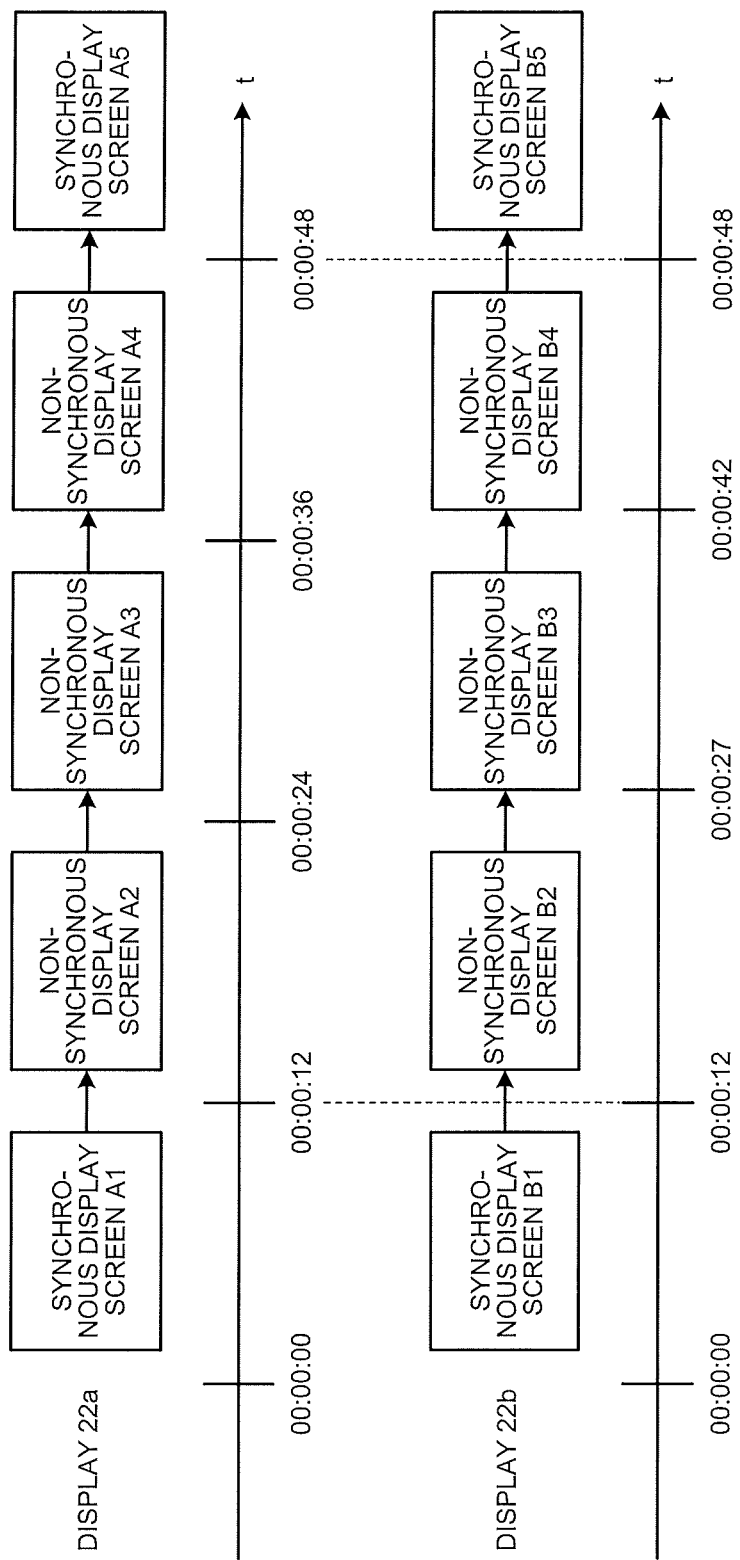
FIG. 7 is a diagram illustrating an example of transition of the display screen according to the first embodiment.

FIG. 7 is a diagram illustrating an example of transition of the display screen according to the first embodiment. FIG. 7 illustrates that the display screen switches from a synchronous display screen to a non-synchronous display screen, and then switches to a synchronous display screen. In FIG. 7, synchronous display screens A1 and B1 start to be displayed at time t=0 second. At t=0 second, the synchronous display screen A1 is displayed on the display unit 22a, and the synchronous display screen B1 is displayed on the display unit 22b. The synchronous display screen A1 and the synchronous display screen B1 form a single screen. Then at t=12 seconds, the display screen on the display unit 22a is switched from the synchronous display screen A1 to a non-synchronous display screen A2, while the display screen on the display unit 22b is switched from the synchronous display screen B1 to a non-synchronous display screen B2. Thereafter, at t=24 seconds, the display screen on the display unit 22a is switched from the non-synchronous display screen A2 to a non-synchronous display screen A3, while the display screen on the display unit 22b is not switched at this timing, but switched from the non-synchronous display screen B2 to a non-synchronous display screen B3 at t=27 seconds. The display screen on the display unit 22a is then switched from the non-synchronous display screen A3 to a non-synchronous display screen A4 at t=36 seconds, while the display screen on the display unit 22b is switched from the non-synchronous display screen B3 to a non-synchronous display screen B4 at t=42 seconds.

As is clear from the foregoing, the display screen on the display unit 22a is switched at 12-second intervals while the display screen on the display unit 22b is switched at 15-second intervals. In other words, each of the non-synchronous display screens A2, A3, and A4 is display data that lasts for 12 seconds, while each of the non-synchronous display screens B2 and B3 is display data that lasts for 15 seconds. The display data that lasts for 15 seconds cannot be assigned to the non-synchronous display screen B4 on the display unit 22b, because, at t=48 seconds, the display screen on the display unit 22b is switched from the non-synchronous display screen B4 to a synchronous display screen B5 while the display screen on the display unit 22a is switched from the non-synchronous display screen A4 to a synchronous display screen A5. The display data generation unit 214 thus generates display data by selecting from the play list in the display content storage unit 213, six-second display data that can be displayed as the non-synchronous display screen B4. Since the first embodiment changes the display screen in accordance with the timing at which to display the synchronous display screen as described above, the synchronous display can be performed without the timing being off.

Although the first embodiment describes the configuration including the two displays, the present invention is not limited to such a configuration but may include three or more display units. That is, a plurality of display units may be included in the present invention.

The configuration described in the first embodiment is the on-board information display device that controls the plurality of display units 22a and 22b. The on-board information display device includes the on-board information display controller 21 including: the display execution processing determination unit 211 that outputs the display-execution-processing determination result indicating whether all the display screens to be displayed on the plurality of display units 22a and 22b are to be synchronized, in accordance with the on-board information to be displayed on the plurality of display units 22a and 22b; and the display data generation unit 214 that receives the display-execution-processing determination result and generates the display data to allow the display screens to be displayed on the plurality of display units 22a and 22b, in synchronization or without synchronization in accordance with the display-execution-processing determination result.

The on-board information display control method described in the first embodiment is the on-board information display control method that controls on-board information display on the plurality of display units 22a and 22b. The method includes: the step of generating the non-synchronous display data and displaying the non-synchronous display data on the plurality of display units 22a and 22b; the step of determining whether all the display screens to be displayed on the plurality of display units 22a and 22b are to be synchronized; the step of generating the full screen synchronous display data that allows all the display screens to be synchronized and displaying the full screen synchronous display data on the plurality of display units 22a and 22b when all the display screens are to be synchronized; and the step of allowing all the display screens to be displayed on the plurality of display units 22a and 22b without synchronization upon completion of displaying of the full screen synchronous display data. Note that all of these steps are performed by the on-board information display controller 21.

Note that the plurality of two or more display units may be included in the first embodiment, where the form of each display is not limited to an independent display panel. A single display panel may be divided into the plurality of display units.

As described above, the first embodiment can effectively display the information by synchronizing the plurality of displays, depending on the information to be provided.

Second Embodiment

While the first embodiment describes the mode of entirely synchronizing the two display units when performing the synchronous display, the present invention is not limited to such a mode. The present embodiment will describe a mode of synchronizing only parts of the plurality of display units. Note that the configuration of the on-board information display control system according to the present embodiment is similar to the configuration illustrated in FIG. 1 of the first embodiment.

Figure 8:
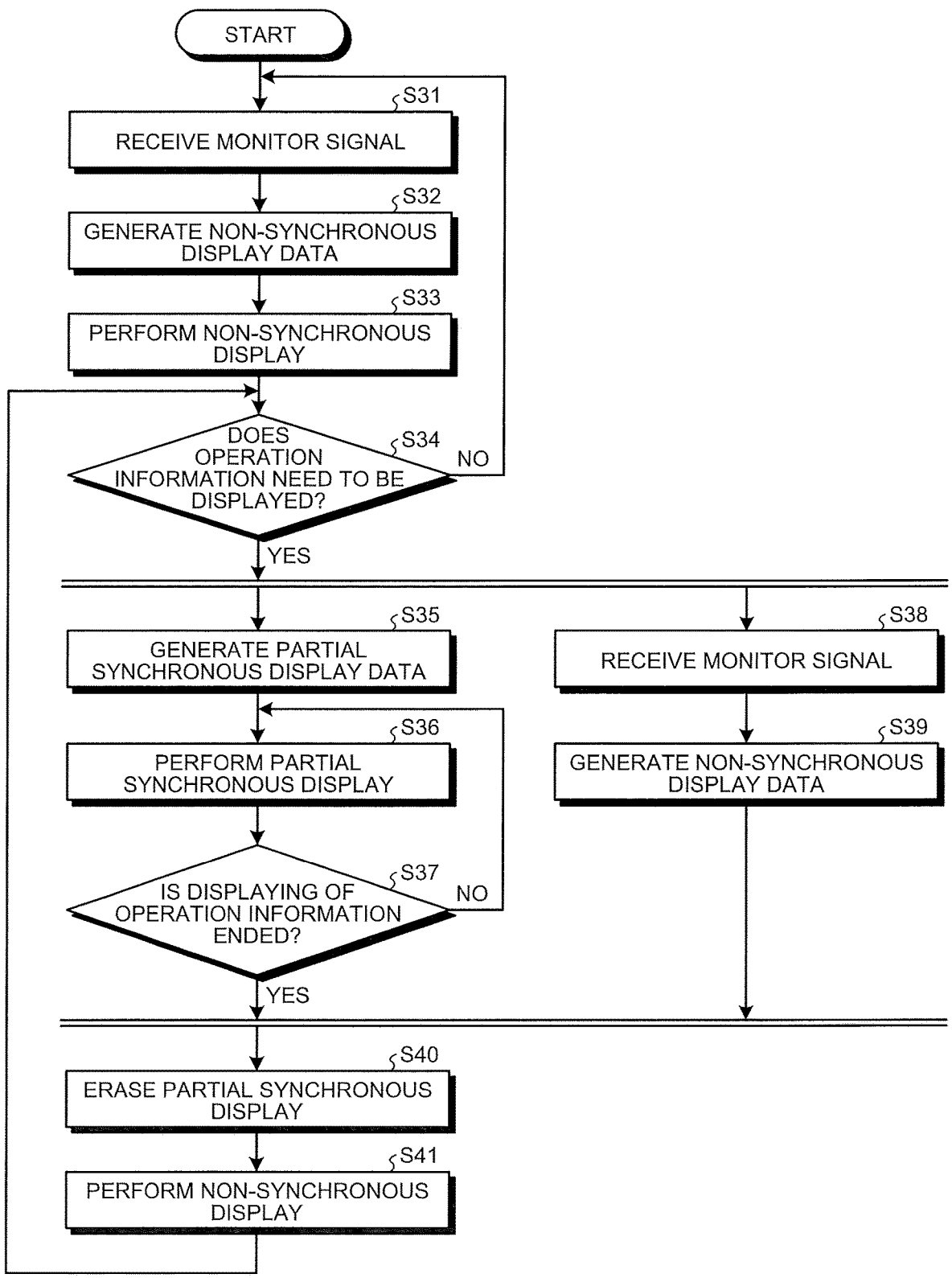
FIG. 8 is a flowchart illustrating an example of the operation of the on-board information display controller of the on-board information display device according to a second embodiment.

FIG. 8 is a flowchart illustrating an example of the operation of the on-board information display controller 21 of the on-board information display device according to a second embodiment. With reference to FIG. 8, a description is made as to a mode in which only parts of the plurality of display units are synchronized to display "operation information" in the synchronized area. The term "operation information" as used herein includes, but not limited to, information regarding the occurrence of an accident causing injury or death on a train route.

Once the processing is started, the display execution processing determination unit 211 receives a monitor signal that is generated from on-board information transmitted from the vehicle information management device 11 (S31) and checks the information. That is, the display execution processing determination unit 211 makes a determination about the content of display execution processing on the basis of the monitor signal generated from the on-board information transmitted by the vehicle information management device 11 and outputs the display-execution-processing determination result to the display data generation unit 214.

Next, the display data generation unit 214 generates non-synchronous display data (S32). The display signal output unit 215 then generates display signals, using the non-synchronous display data and outputs the display signals to the display units 22a and 22b, whereby the displays 22a and 22b perform non-synchronous display (S33).

Next, the display execution processing determination unit 211 generates a display signal, using the non-synchronous display data, and determines whether the operation information needs to be displayed on the display units 22a and 22b (S34). If the operation information need not be displayed (No in S34), the processing returns to S31 to receive the monitor signal and check the information from the vehicle information management device 11. That is, the processing from S31 to S33 is repeated until it becomes necessary to display the operation information. If the operation information needs to be displayed (Yes in S34), the display data generation unit 214 generates partial synchronous display data to display the operation information (S35), whereby the display units 22a and 22b perform partial synchronous display (S36). The display execution processing determination unit 211 thereafter determines whether displaying of the operation information is ended (S37). The term "partial synchronous display" as used herein means that the display units 22a and 22b have their parts jointly forming a single display screen to perform the display.

In parallel with the processing from S35 to S37, the display execution processing determination unit 211 receives the monitor signal from the vehicle information management device 11 (S38) and checks the information, so that the display data generation unit 214 generates non-synchronous display data (S39). The display units 22a and 22b continue to perform the partial synchronous display (S36) if displaying of the operation information is not ended (No in S37). If displaying of the operation information is ended (Yes in S37), the display units 22a and 22b erase the partial synchronous display (S40) and use the non-synchronous display data generated in S39, so that the areas of the display units, which performed the partial synchronous display, now perform the non-synchronous display (S41), which in turn returns the processing to S34.

Note that the information that requires the display units 22a and 22b to synchronize with each other for the partial screen synchronous display includes not only the operation information discussed with reference to FIG. 8, but also delay information, public relations (PR) text, and news. The delay information includes information regarding a delay occurring on a train and a delay occurring on a route of the train. The PR text includes information regarding text that raises awareness for manners and public service activities that a train operating company does.

Note that ground information transmitted from a ground radio station as needed acts as a trigger to start displaying the information which should be displayed on the display units in synchronization. The trigger, which starts displaying the information on the display units in synchronization, is not limited to that ground information, but may be vehicle information such as the kilometrage or speed of the train.

Note that the non-synchronous display data in S39 is generated at regular intervals, and the generated non-synchronous display data is used in performing the non-synchronous display in S41 in the areas that performed the partial synchronous display.

Figure 9:
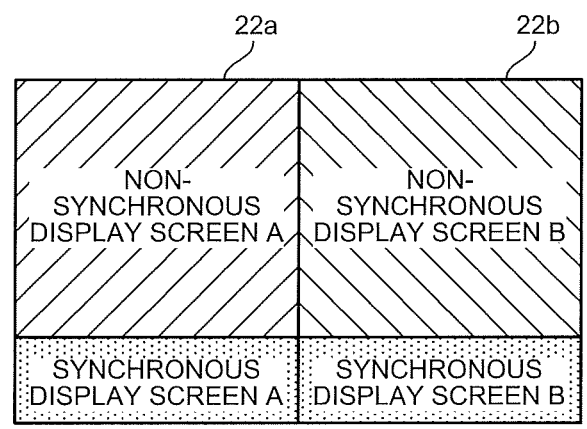
FIG. 9 is a diagram illustrating an example of the display screen according to the second embodiment.

FIG. 9 is a diagram illustrating an example of the display screen according to the second embodiment. As illustrated in FIG. 9, the synchronous display screen A is displayed at the bottom of the display unit 22a, the synchronous display screen B is displayed at the bottom of the display unit 22b, and the synchronous display screen A and the synchronous display screen B form a single screen. The display unit 22a displays a non-synchronous display screen A on the area thereof other than the synchronous display screen A. The display unit 22b displays a non-synchronous display screen B on the area thereof other than the synchronous display screen B.

Figure 10:
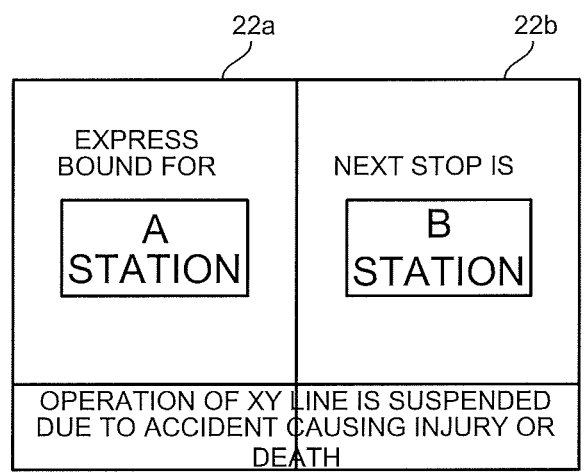
FIG. 10 is a diagram illustrating a specific example of the display screen according to the second embodiment.

FIG. 10 is a diagram illustrating a specific example of the display screen according to the second embodiment. The synchronous display screen A and the synchronous display screen B in FIG. 10 act together as the single screen indicating that the operation of an XY line is suspended due to an accident causing injury or death while the non-synchronous display screen A indicates that the train is an express train bound for an A station and the non-synchronous display screen B indicates that the next stop is a B station. While performing the non-synchronous display to thereby provide the information, the plural display units perform the synchronous display on the parts thereof to thereby display the operation information, as illustrated in FIG. 10. Depending on the information that should be provided, as described above, the second embodiment can set the layout of the display screen with a degree of freedom higher than the layout of the display screen in the first embodiment.

The configuration described in the second embodiment above is the on-board information display device that controls the plurality of displays 22a and 22b. The on-board information display device includes the on-board information display controller 21 including: the display execution processing determination unit 211 that outputs the display-execution-processing determination result indicating whether parts of the display screens to be displayed on the plurality of display units 22a and 22b are to be synchronized, in accordance with the on-board information to be displayed on the plurality of display units 22a and 22b; and the display data generation unit 214 that receives the display-execution-processing determination result and generates the display data to allow the display screens to be displayed on the plurality of display units 22a and 22b, in synchronization or without synchronization in accordance with the display-execution-processing determination result.

The on-board information display control method described in the second embodiment is the on-board information display control method that controls on-board information display on the plurality of display units 22a and 22b. The method includes: the step of generating the non-synchronous display data and displaying the non-synchronous display data on the plurality of display units 22a and 22b; the step of determining whether parts of the display screens to be displayed on the plurality of display units 22a and 22b are to be synchronized; the step of generating the synchronous display data that allows the parts of the display screens to be synchronized, and displaying the synchronous display data on the plurality of display units 22a and 22b when the parts of the display screens are to be synchronized; and the step of allowing the parts of the display screens to be displayed on the plurality of display units 22a and 22b without synchronization upon completion of displaying of the synchronous display data.

Third Embodiment

The first and second embodiments describe the configuration in which the on-board information display device 20 includes the on-board information display controller 21, but the present invention is not limited to such a configuration. The present embodiment will describe a mode in which the configuration including the on-board information display controller 21 is different from the configuration in the first and second embodiments.

Figure 11:
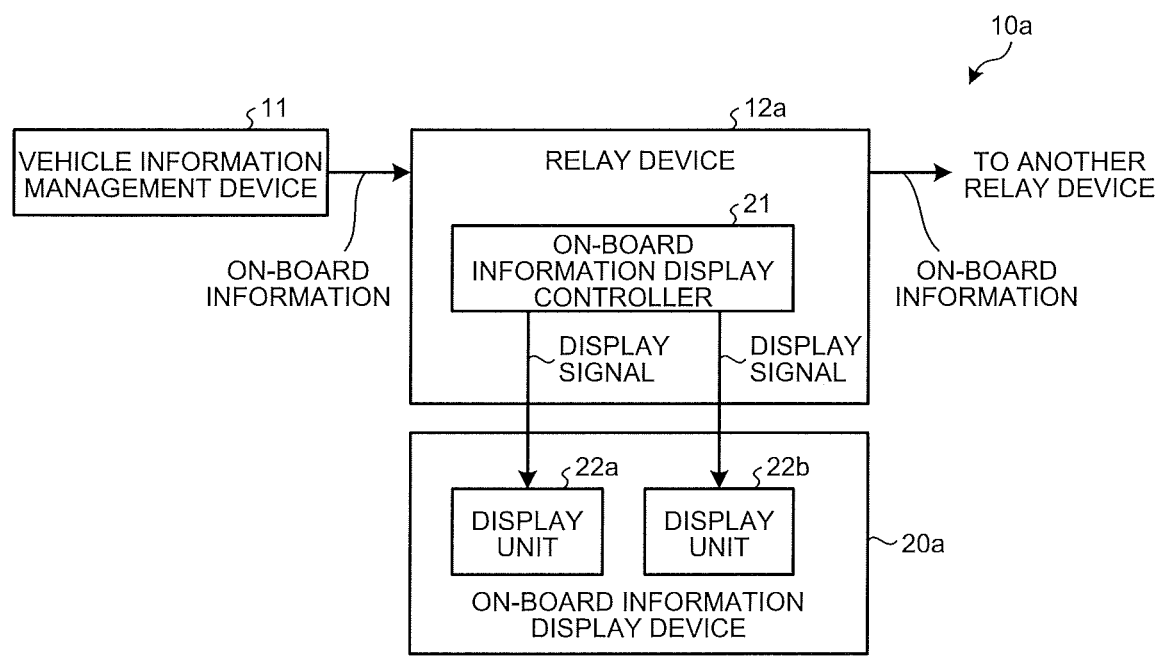
FIG. 11 is a diagram illustrating an example of the configuration of an on-board information display control system according to a third embodiment.

FIG. 11 is a diagram illustrating an example of the configuration of an on-board information display control system 10a according to a third embodiment of the present invention. The on-board information display control system 10a illustrated in FIG. 11 includes the vehicle information management device 11, a relay device 12a including the on-board information display controller 21, and an on-board information display device 20a including the display units 22a and 22b.

Figure 12:
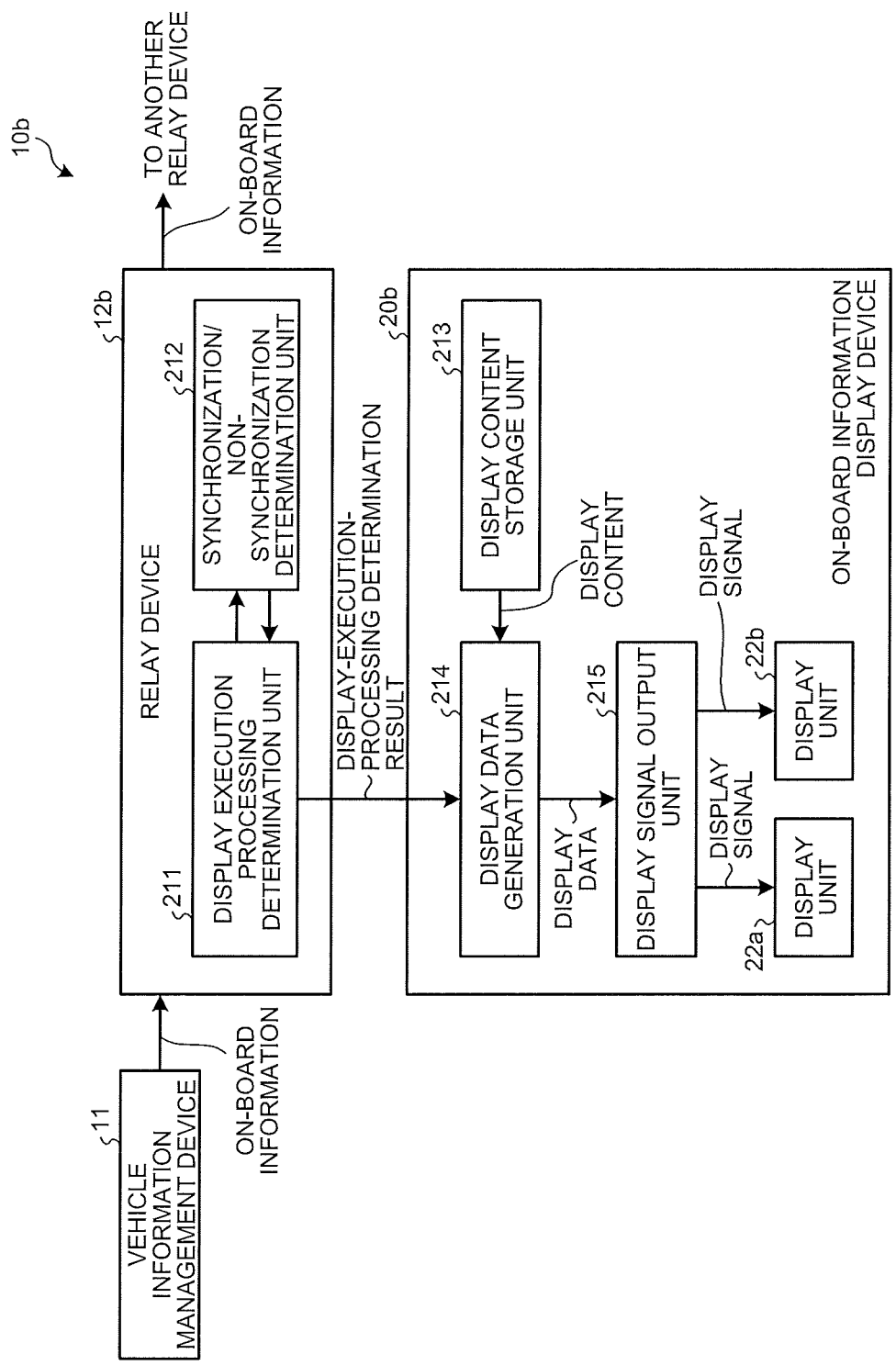
FIG. 12 is a diagram illustrating an example of the configuration of an on-board information display control system according to the third embodiment.

FIG. 12 is a diagram illustrating an example of the configuration of an on-board information display control system 10b according to the third embodiment of the present invention. The on-board information display control system 10b illustrated in FIG. 12 includes the vehicle information management device 11, a relay device 12b including the display execution processing determination unit 211 and the synchronization/non-synchronization determination unit 212, and an on-board information display device 20b including the display content storage unit 213, the display data generation unit 214, the display signal output unit 215, and the display units 22a and 22b.

That is, the configuration illustrated in FIG. 12 is the on-board information display control system that controls on-board information display on the plurality of display units 22a and 22b. The on-board information display control system includes: the relay device 12b that outputs a display-execution-processing determination result indicating whether parts or all of the display screens to be displayed on the plurality of display units 22a and 22b are to be synchronized, in accordance with on-board information to be displayed on the plurality of display units 22a and 22b; and the on-board information display device 20b that receives the display-execution-processing determination result and generates display data to allow the display screens to be displayed on the plurality of display units 22a and 22b, in synchronization or without synchronization in accordance with the display-execution-processing determination result.

Figure 13:
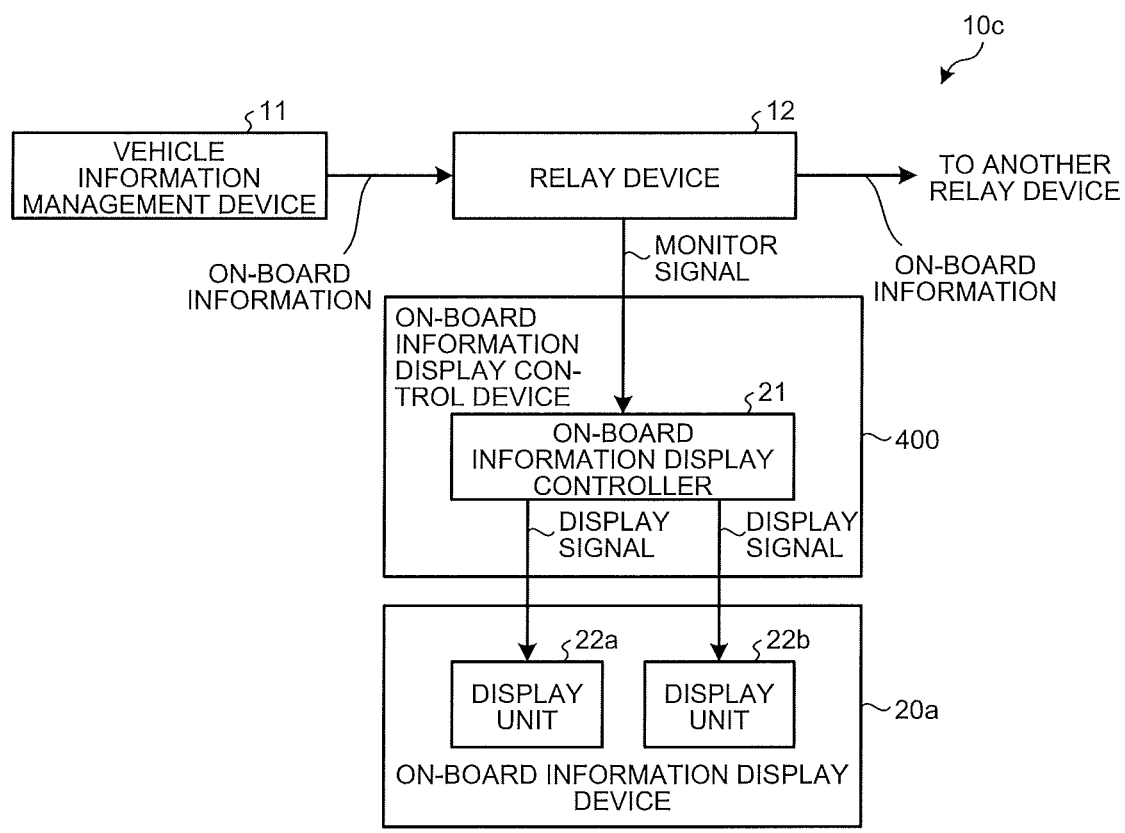
FIG. 13 is a diagram illustrating an example of the configuration of an on-board information display control system including an on-board information display control device according to the third embodiment.

FIG. 13 is a diagram illustrating an example of the configuration of an on-board information display control system 10c including an on-board information display control device 400 according to the third embodiment of the present invention. The on-board information display control system 10c illustrated in FIG. 13 includes the vehicle information management device 11, the relay device 12, the on-board information display control device 400 including the on-board information display controller 21, and the on-board information display device 20a including the display units 22a and 22b. That is, the on-board information display control device 400 illustrated in FIG. 13 is the on-board information display control device that controls the plurality of display units 22a and 22b. The on-board information display control device includes: the display execution processing determination unit 211 that outputs a display-execution-processing determination result indicating whether parts or all of the display screens to be displayed on the plurality of display units 22a and 22b are to be synchronized, in accordance with on-board information to be displayed on the plurality of display units 22a and 22b; and the display data generation unit 214 that receives the display-execution-processing determination result and generates display data to allow the display screens to be displayed on the plurality of display units 22a and 22b, in synchronization or without synchronization in accordance with the display-execution-processing determination result.

As described in the third embodiment, the configuration including the on-board information display controller is not limited to the on-board information display device.

In the configurations illustrated in the first to third embodiments above, the plurality of display units 22a and 22b is arranged side by side and synchronized in accordance with the display-execution-processing determination result provided by the display execution processing determination unit 211, whereby the plurality of display units 22a and 22b form the single display screen thereon. The plurality of displays, which is synchronized to form the single display screen, can thus display the information effectively depending on the information that is to be provided.

The configuration illustrated in the aforementioned embodiment merely illustrates an example of the content of the preset invention, and can thus be combined with another known technique or partially omitted and/or modified without departing from the scope of the present invention.

REFERENCE SIGNS LIST 10, 10a, 10b, 10c on-board information display control system; 11 vehicle information management device; 12, 12a, 12b relay device; 20, 20a, 20b on-board information display device; 21 on-board information display controller; 22a, 22b display units; 210 monitor signal reception unit; 211 display execution processing determination unit; 212 synchronization/non-synchronization determination unit; 213 display content storage unit; 214 display data generation unit; 215 display signal output unit; 301 processor; 302 memory; 303 reception unit; 304 output unit; 400 on-board information display control device.

The invention claimed is:

1. An on-board information display control system to control on-board information display on a plurality of displays arranged side by side, the system comprising:
an on-board information display device including a display content storage to store a display content; and
a relay including a synchronization/non-synchronization determiner to determine, based on on-board information content of a message that is to be displayed on the plurality of displays arranged side by side, whether or not to synchronously display parts or all of display screens to be displayed on the plurality of displays, the relay outputting a display-execution-processing determination result on a basis of the whether or not to synchronously display the parts or all of the display screens, wherein
the relay is configured to receive the on-board information content from a vehicle information management device,
the relay being a separate device from the on-board information display device and the vehicle information management device, and
the on-board information display device receives the display-execution-processing determination result and generates display data from the display content and displays the data to allow the display screens to be displayed on the plurality of displays, in synchronization or without synchronization, in accordance with the display-execution-processing determination result,
wherein, at a first time, the plurality of displays is synchronized in accordance with the display-execution-processing determination result to thereby form a single display screen on the plurality of displays,
wherein each display, of the of the plurality of displays, has a first viewing portion and a second viewing portion, and wherein the synchronization/non-synchronization determiner determines, at a second time, not to synchronize the first viewing portions of the plurality of displays and determines to synchronize the second viewing portions of the plurality of displays.

* * * * *